(12) United States Patent
Criaud et al.

(10) Patent No.: US 7,486,178 B2
(45) Date of Patent: Feb. 3, 2009

(54) ELECTRICAL CONNECTION SYSTEM BETWEEN A WHEEL AND A BEARING-HUB ASSEMBLY

(75) Inventors: Christophe Criaud, Riom (FR); Sébastien Drap, Vassel (FR); Salima Fahas, Riom (FR); Bruno Giai, Abbadia Alpina (IT); Alexander Molenaar, GA Kamerik (NL); Rafaële Montagnoni, Pinerolo (IT); Simona Pilone, Genoa (IT)

(73) Assignees: Michelin Recherche et Technique S.A., Granges-Paccot (CH); SKF Industrie SpA, Turin (IT)

( * ) Notice: Subject to any disclaimer, the term of this patent is extended or adjusted under 35 U.S.C. 154(b) by 577 days.

(21) Appl. No.: 11/314,888

(22) Filed: Dec. 20, 2005

(65) Prior Publication Data

US 2006/0205241 A1 Sep. 14, 2006

Related U.S. Application Data

(63) Continuation of application No. PCT/EP2004/006778, filed on Jun. 23, 2004.

(30) Foreign Application Priority Data

Jun. 24, 2003 (FR) .................................. 03 07630

(51) Int. Cl.
*B60C 23/00* (2006.01)
*H01R 41/00* (2006.01)
*F16C 19/00* (2006.01)
*G08B 21/00* (2006.01)

(52) U.S. Cl. ..................... 340/442; 340/671; 340/672; 340/686.3; 439/13; 384/91

(58) Field of Classification Search ................. 340/442, 340/671, 672
See application file for complete search history.

(56) References Cited

U.S. PATENT DOCUMENTS

| 3,719,916 A | * | 3/1973 | Worner et al. ................. 439/16 |
| 3,757,294 A | | 9/1973 | Schultz |
| 3,944,971 A | | 3/1976 | Ramirez |
| 4,837,553 A | | 6/1989 | Pompier |

FOREIGN PATENT DOCUMENTS

DE 92 11 497 U 11/1992

* cited by examiner

*Primary Examiner*—Donnie L Crosland
(74) *Attorney, Agent, or Firm*—Cohen Pontani Lieberman & Pavane LLP

(57) ABSTRACT

Electrical connection system between a wheel and a bearing-hub assembly, the wheel being mounted on an outer flange of the bearing-hub assembly, and the bearing-hub assembly comprising a rotationally fixed outer ring attached to the vehicle's suspension and an inner ring provided with a centering collar, an open frontal cavity defined in the said centering collar and an axial cavity opening into the said cavity; the connection system having a first connection cable attached to the inner ring and extending inside the axial cavity and the frontal cavity, a second connection cable integrated with the wheel, and a connection element associated with the said centering collar to provide electrical contact that can be selectively disconnected between the first cable and the second cable.

18 Claims, 11 Drawing Sheets

ELECTRICAL CONNECTION SYSTEM BETWEEN A WHEEL AND A BEARING-HUB ASSEMBLY

This application is a U.S. Continuation Application under 35 USC 371 of International Application PCT/EP2004/006778 filed Jun. 23, 2004.

The present invention concerns an electrical connection system between a wheel and a bearing-hub assembly.

From U.S. Pat. No. 4,837,553 an electrical connection system between a wheel and a bearing-hub assembly is known, which is designed to transmit an electric signal from a pressure sensor inside the wheel of a vehicle to the said vehicle and which comprises an electric circuit defined by two electrical paths, a first one of these electrical paths extending from one pole of the sensor along a chain of metallic components in electric contact with one another and defined inter alia by an outer ring of the bearing-hub assembly and by a suspension of the vehicle, and a second electrical path extending from a second pole of the sensor to a transmission of the vehicle and passing through an axial hole formed in an inner ring of the bearing-hub assembly.

The first electrical path also includes a warning light located inside the vehicle and connected to the positive pole of a battery, and the second electrical path is used to connect the second pole of the sensor to earth and thereby to complete the electric circuit.

In the US patent described above, the pressure sensor is a purely passive sensor in which a fall of the wheel's pressure results in an electric connection between the first and second poles and consequently actuates the warning light.

The electrical connection system described above has certain disadvantages, due partly to the very marked exiguity of the structure and partly to the constitution of the first electrical path. In effect, the structural exiguity of this electrical connection system renders it unsuitable for installation in vehicles of the latest generation in which, during service, the system has to transfer to the wheel fairly large amounts of information and must enable the use of more sophisticated sensors. Moreover, the constitution of the electric circuit and particularly that of the second electrical path not only prevents the use of other sensors, but also precludes the use of active sensors which have to be supplied with electricity in order to operate.

The purpose of the present invention is to provide an electrical connection system between a wheel and a bearing-hub assembly, which does not have the above disadvantages.

According to the present invention an electrical connection system is formed between a wheel and a bearing-hub assembly, the wheel being mounted on an outer flange of the bearing-hub assembly and the bearing-hub assembly comprising an outer, rotationally fixed ring integral with the vehicle's suspension and an inner ring provided with a centering collar, a frontal open cavity defined by the said centering collar and an axial cavity opening into the said frontal cavity; the electrical connection system being characterized in that it comprises a first connection cable attached to the inner ring and extending within the axial cavity and the frontal cavity, a second connection cable integrated in the said wheel, and connection means associated with the said centering collar to ensure selectively disconnectable electric contact between the first and second cables.

Such a connection system enables sensors arranged in the wheel to be supplied with electrical energy so that these sensors can be active, and a large amount of information to be transmitted to the vehicle.

The invention will be described with reference to the attached drawings, which illustrate a non-limiting example embodiment of it and in which.

Figure 1:
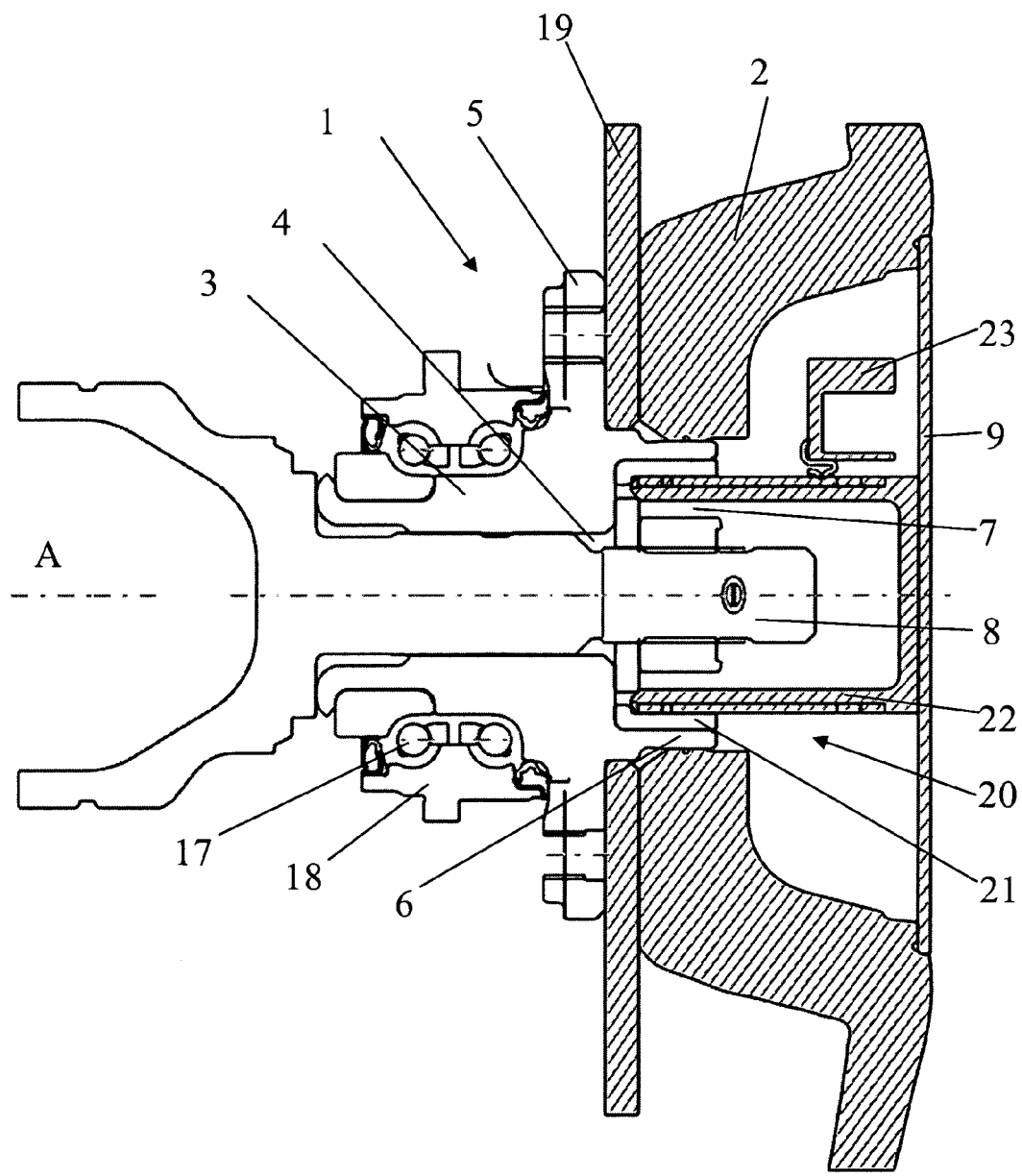
FIG. 1 shows a schematic sectional view of a complete hub-bearing and wheel assembly with the main elements of a first electrical connection system according to the invention.

FIG. 1 shows a schematic sectioned view of a bearing-hub assembly 1 and wheel 2, with the main elements of an electrical connection system 20 according to the invention.

The bearing-hub assembly 1 comprises an inner ring 3 designed to rotate about an axis A, a fixing flange 5 for the mounting of a wheel 2 and a centering collar 6 designed to centre the wheel 2 during its mounting. The inner ring 3 has an inner axial cavity 4. This cavity is designed to surround a stub axle 8 during the mounting of the hub-bearing assembly onto the axle of the vehicle, in the case of a driving axle. The centering collar 6 defines a cavity 7 open towards the outside of the assembly 1 on the side facing the wheel 2.

In the example embodiment of the hub-bearing assembly 1 shown in FIG. 1, the inner ring 3, the fixing flange 5 and the centering collar 6 are made integrally as a single casting.

A first electrical connection system 20 according to the invention comprises a first electrical connection element 21 fitted axially against the radially inner wall of the centering collar 6, and a second, rotationally symmetrical electrical connection element 22 which has a U-shaped axial cross-section with the two arms of the U fitting axially against the radially inner wall of the first electrical connection element 21 and extending axially beyond the centering collar 6, while remaining inside the volume defined by the outer surface of the wheel 2. The system 20 also comprises a third electrical connection element 23.

FIG. 1 also shows schematically a hub cap 9 whose central part rests against the end of the second connection element 22, as well as a brake disc 19, the fixed outer ring 18 and the balls 17 of the bearing.

Figure 2:
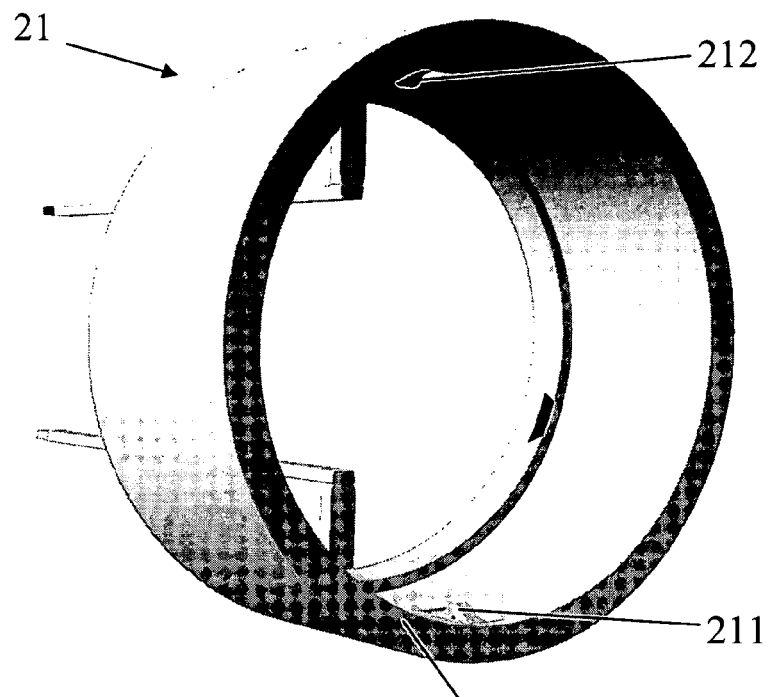
FIG. 2 shows a first connection element, viewed in perspective.
Figure 3:
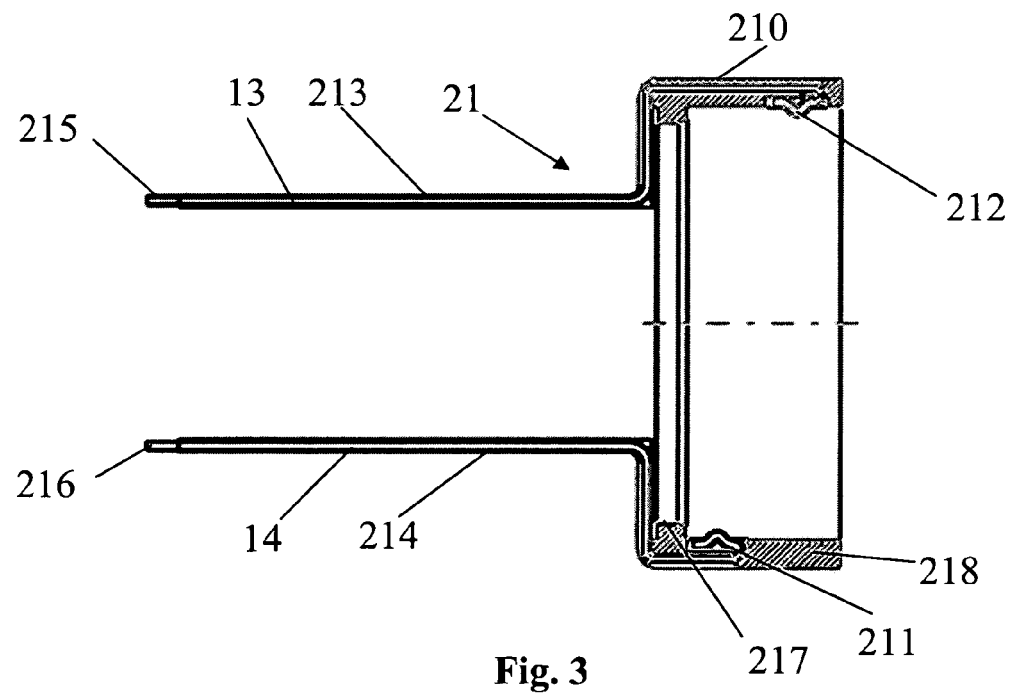
FIG. 3 shows the first connection element of FIG. 2, viewed in cross-section.

An embodiment of the first connection element 21 will now be described with reference to FIGS. 2 and 3. The said element 21 is essentially a rotationally symmetrical tubular component 210 of a size such that it can fit axially into the cavity 7 of the centering collar 6. The axial length of the element 21 is essentially equal to that of the centering collar 6. The element 21 also has two extensions 213 and 214 with two wires 13 and 14 inside them. These extensions are preferably made of rigid plastic to facilitate the mounting of the element and the passage of the two extensions through grooves formed in the radially inside wall of the inner cavity 4 of the inner ring 3. The ends 215 and 216 can then be connected electrically to the electric transmission means (not shown) of the hub-bearing assembly designed to make contact with the vehicle. Two electric point contacts 211 and 212 are positioned on the radially inside wall of the tubular part 210 of the element 21. These contacts are axially offset and are of course electrically connected with the wires 13 and 14. The element 21 consists essentially of an insulator 218 and also comprises a circular reinforcement 217. The said reinforcement can be made of a rigid plastic or metallic material.

Figure 4:
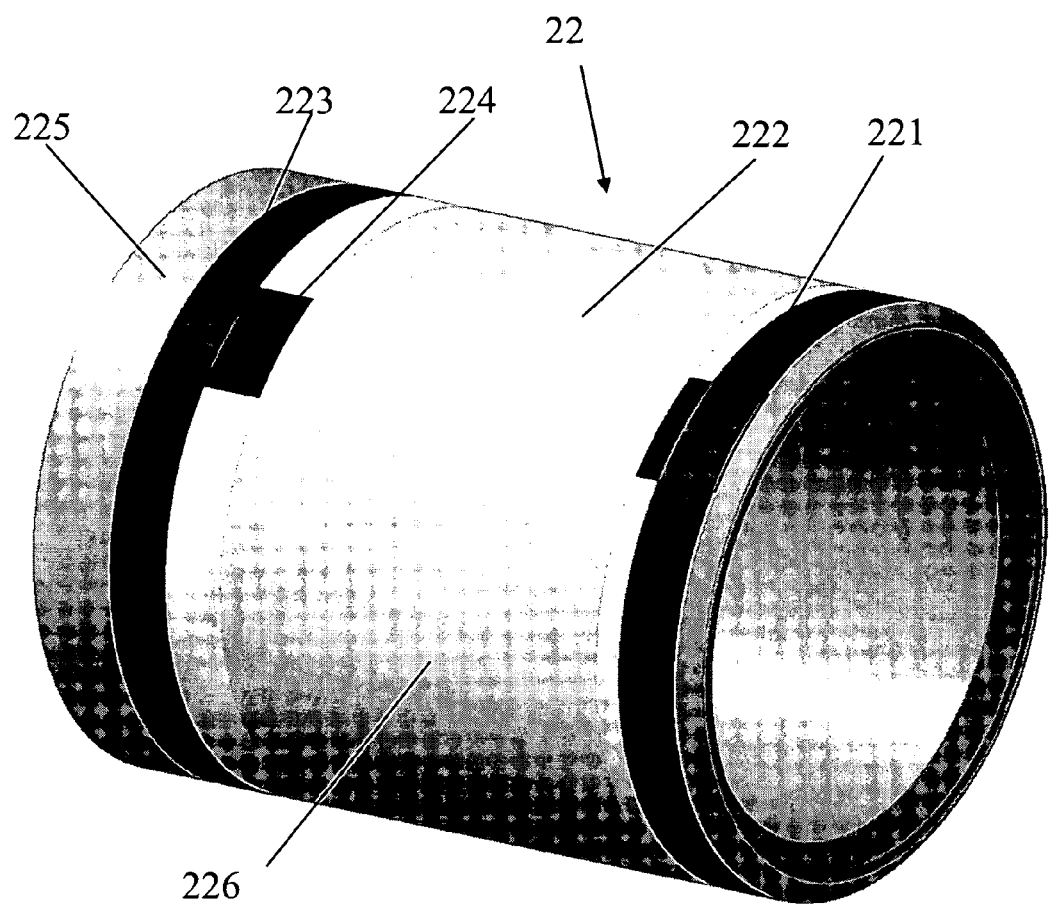
FIG. 4 shows a second connection element, viewed in perspective.

FIG. 4 shows a schematic perspective view of the second electrical connection element 22 of the system 20. This element is a rotationally symmetrical component with a U-shaped axial cross-section, having a tubular part 226 and a flat bottom 225. It consists essentially of an insulating material with three electric contacts in the form of annular electric conducting paths 221, 222 and 223 arranged on the radially outside wall of its tubular part. The element 22 is designed to fit axially inside the first connection element 21. The paths 221 and 222 are positioned axially such that, when so fitted, they make contact with the contacts 211 and 212 of the said element 21. The circular shape of the contacts of the element 22 has the advantage of not requiring a precise azimuth for assembly. In this way, assembly is made easier. It would of course be possible to arrange things the other way round and position the circular contacts on the element 21, but granted that the element 22 is axially longer, it is easier to have the said circular paths on the second element 22. The contact 223 is also circular and is arranged axially close to the bottom of the element 22, beyond the contact 222. Thus, the contact 222 is located axially between the two contacts 221 and 223, and preferably has a substantially longer axial width such that after fitting into the element 21 and the hub-bearing assembly, this contact 222 extends axially, beyond the said element 21. The two contacts 221 and 223 are connected by a conductor 224 which is insulated relative to the contact 222.

Figure 5:
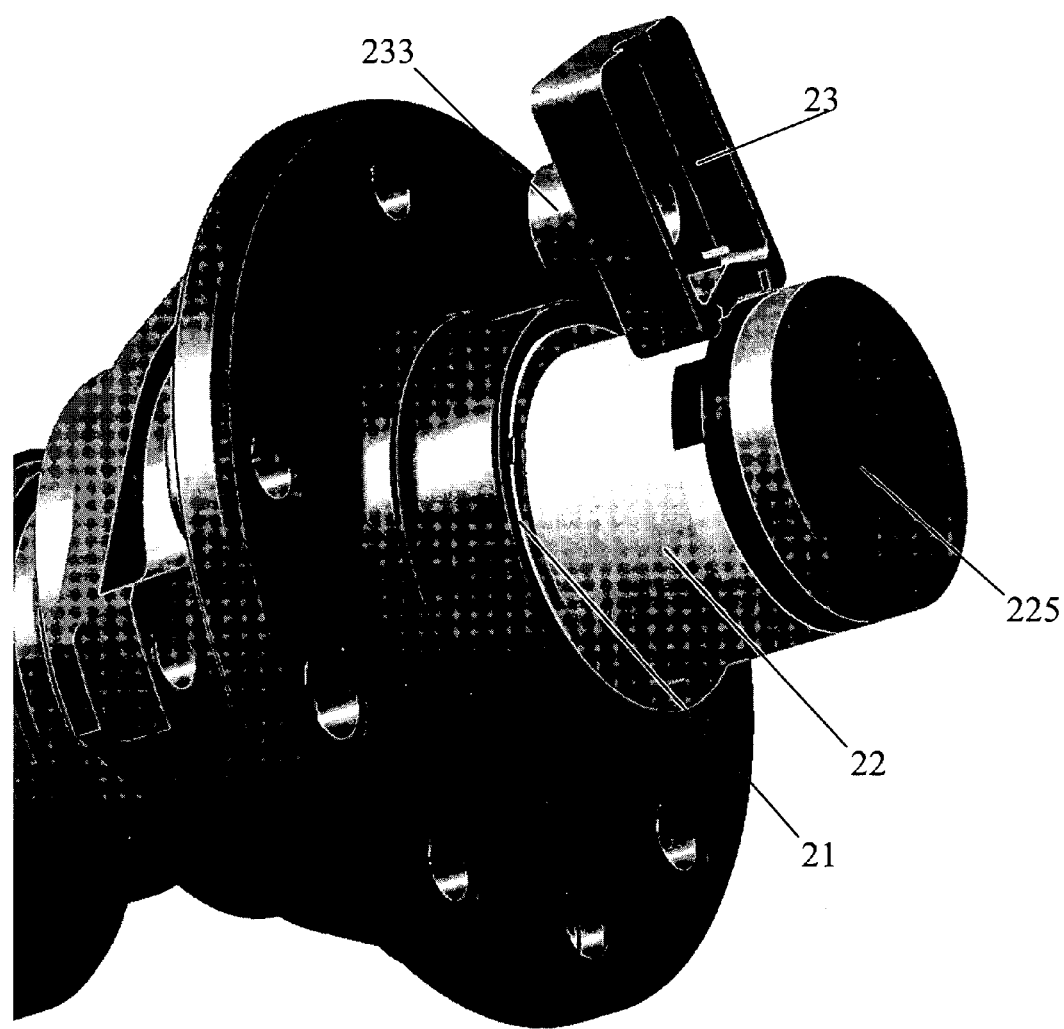
FIG. 5 shows a perspective view of the first two elements assembled with a third connection element.
Figure 6:
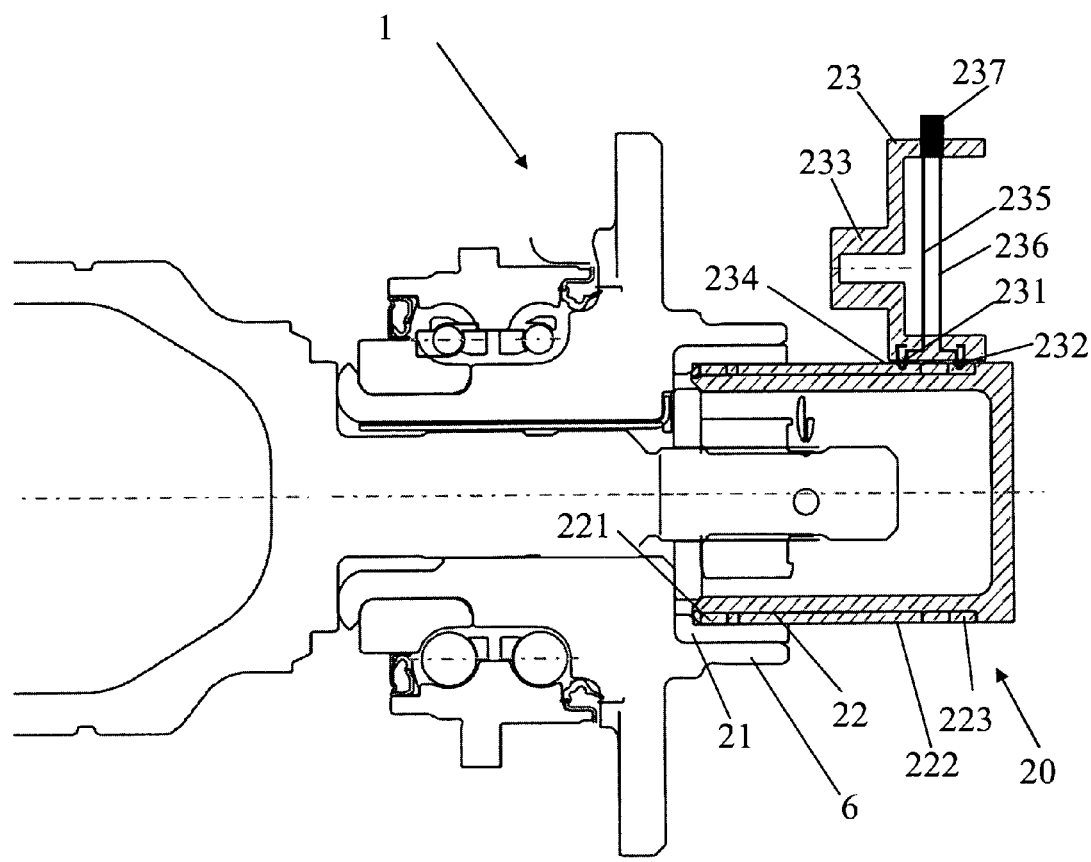
FIG. 6 shows a cross-section of the preceding view of FIG. 5.

FIGS. 5 and 6 show, respectively, a perspective view and a cross-section of the two components 21 and 22 as well as a third element 23 of the system 20. The element 23 is in radial contact with the outside of the element 22, axially outside the element 21 and the centering collar 6. The projection 233 enables the element 23 to be attached to a gudgeon of the wheel 2, for example the one usually provided to serve as an anti-theft device for the wheel.

The element 23 is in the form of a parallelepiped with a wall 234 shaped to conform to the curvature of the tubular part of the element 22 so as to come into contact therewith. It comprises two point contacts 231 and 232, which are axially offset so as to make contact, respectively, with the circular contacts 222 and 223 of the element 22. The said contacts 231 and 232 are electrically connected each to a wire 235 and 236, these two wires then being integrated in a connection cable 237 of the wheel's electric transmission device.

The three elements 21, 22 and 23 of the system 20 have the advantage that they do not in any way modify or interfere with the mounting of a hub and bearing on the axle, or of a wheel on the axle. The three elements are fitted in succession without supplementary means and can also be disassembled easily.

Figure 7:
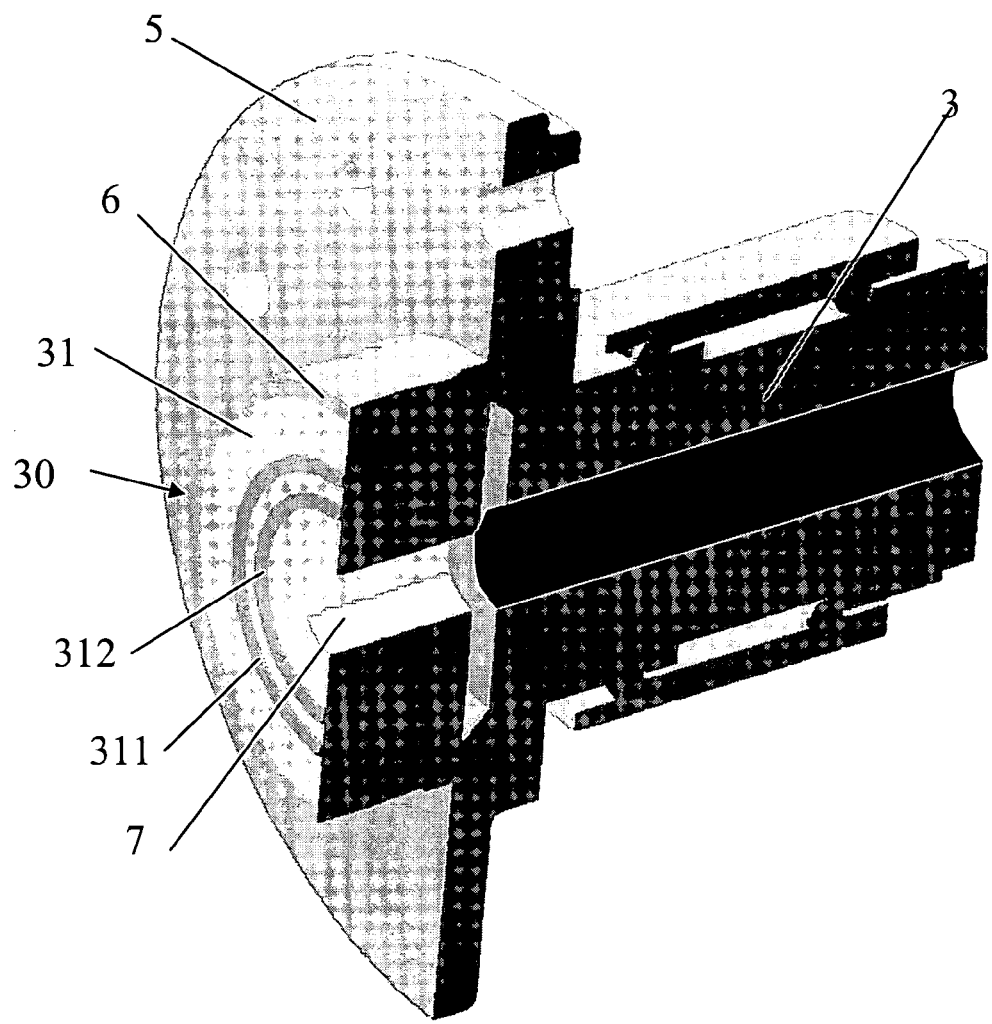
FIG. 7 shows a schematic perspective view of a second electrical connection system according to the invention.
Figure 8:
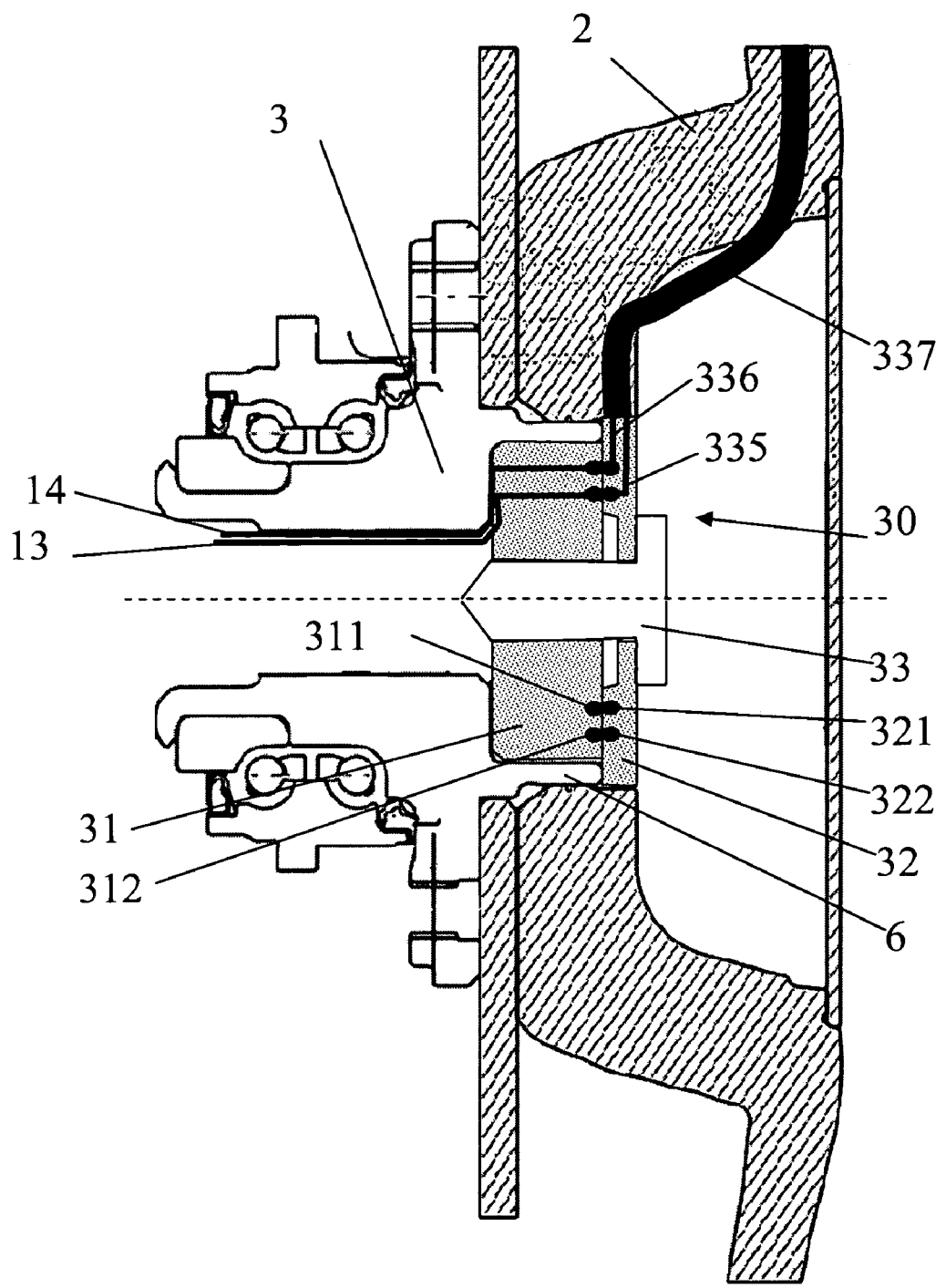
FIG. 8 shows a cross-section of the connection system of FIG. 7.

FIGS. 7 and 8 show a second embodiment 30 of a system according to the invention. FIG. 7 is a schematic perspective view and FIG. 8 is a cross-section. These schematic views show an element 31 whose function is similar to that of the element 21, fitted into the cavity 7 of a centering collar 6.

The element 31 is distinct in having an essentially cylindrical shape with two contacts 311 and 312 arranged on its axially outer part. The direction of the contacts is therefore axial and no longer radial. Here, the contacts are in the form of a circular conducting path but they could also be point contacts. An element 32 can then be provided in the form of a disc with two contacts 321 and 322 positioned on the inside wall of the bottom of the disc opposite the contacts of the element 31. The contacts of the two elements are in this case all in the form of circular paths, but one of the elements could have point contacts without affecting the possibility of assembling the two elements without special azimuthing. Assembly of the two elements together ensures electrical continuity between the contacts. This assembly is ensured by a screw-bolt 33. The wires 335 and 336 connect the contacts 321 and 322 of the element 32 to the cable 337 connected to the wheel's electrical transmission means. On the other side, the wires 13 and 14 are connected to the conducting paths 311 and 312 of the element 31.

Figure 9:
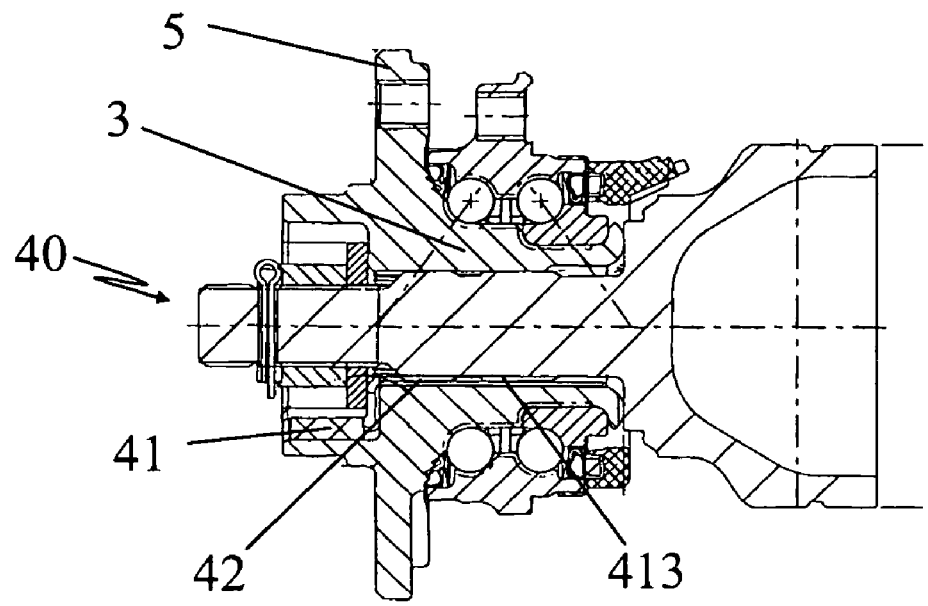
FIG. 9 shows a cross-section of a third connection system according to the invention.
Figure 10:
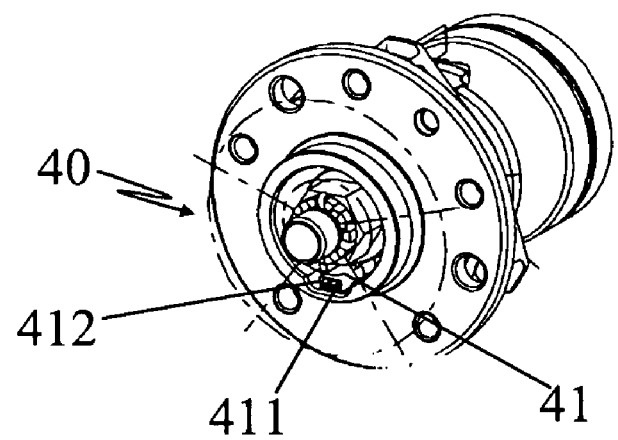
FIG. 10 shows a partial perspective view of the system according to FIG. 9.

FIGS. 9 and 10 show respectively a cross-section and a perspective view of a third type of electrical connection system 40 according to the invention. In this third type of system there is an element 41 fixed, for example by bonding, to the inside wall of the centering collar 6 and a cable 413 that extends along a groove 42 formed along the cavity 4 of the inner ring 3. The element 41 is a connector, for example a male one, which is orientated axially and comprises two contacts 411, 412 which can be seen in FIG. 10. The second connection element is then the female part of the connector 41 and fits into the latter. This second element is extended by the cable forming the electrical connection to the wheel's electric transmission means.

Figure 11:
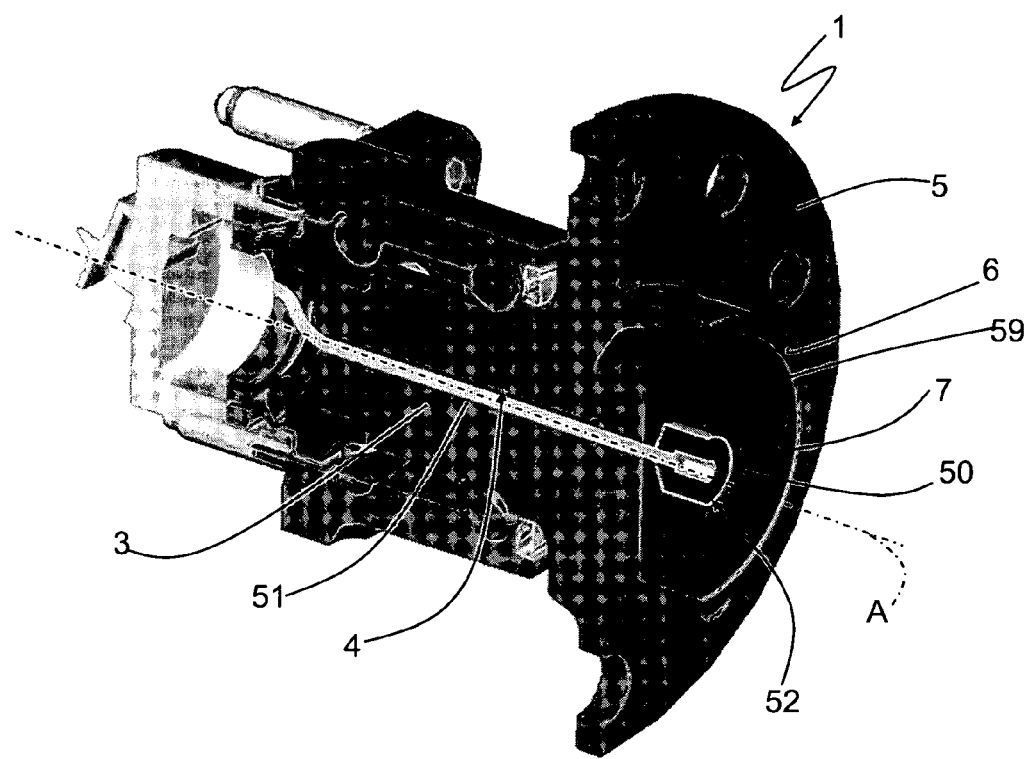
FIG. 11 is a schematic perspective view of a fourth embodiment of the electrical connection system according to the present invention.
Figure 12:
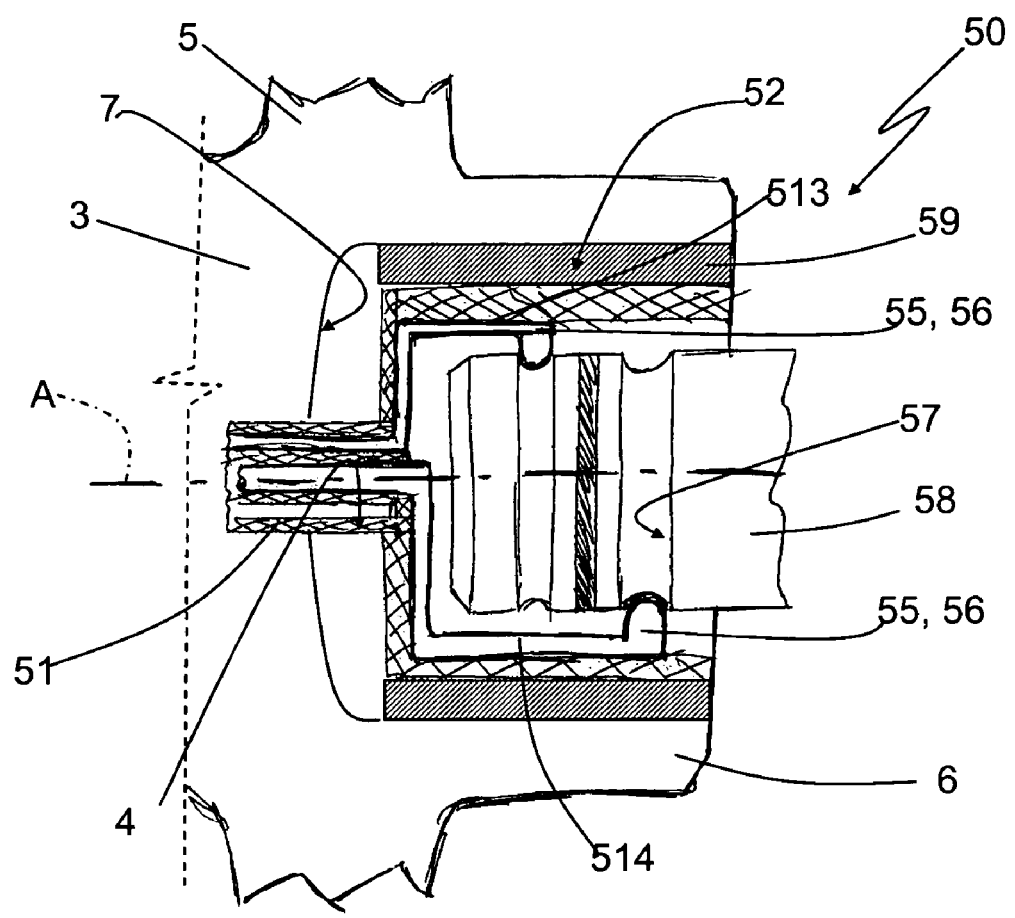
FIG. 12 shows a first preferred embodiment of a particular detail of the system of FIG. 11, represented partly in section and partly cut off for the sake of clarity.

The embodiment shown in FIG. 11 is a connection system 50 analogous to the systems 30 and 40, but differing from these in that it comprises an axial connection element arranged in line with the axis A which has a connection cable 51 that extends inside the cavity 4 and a connector 52 arranged coaxially relative to the axis A and which is connected to the cable 51 so as to form an electrical connection between the wheel 2 and the cable 51 itself As can best be seen in FIG. 12, the cable 51 comprises one or more wires 513 for the transmission of data from the wheel 2 to the cable 51, and one or more wires 514 for supplying electricity from the cable 51 to the wheel 2. In the example embodiment illustrated, the cable 51 consists of a single wire 513 and a single wire 514, but it can have a larger number of wires 513 or wires 514.

To enable easy connection between the electric cable connected to the electric transmission means of the wheel 2 and the connector 52, the latter is mounted without regard to a given angular position relative to the axis A, and has two mechanical locking elements 55 which are interposed between the centering collar 6 and the wheel 2 so as also to ensure electrical connection between the centering collar 6 and the wheel 2 itself.

In addition, the connector comprises two rings 56 of a conducting material which are connected to the wires 513 and 514 and which extend radially towards the inside of the centering collar 6 and also define the locking elements 55. Each of the two rings 56 can engage with a respective electrical path 57 which is formed on a stud 58 integral with the wheel 2 and can be inserted into the centering collar 6 in a position coaxial with respect to the axis A.

Finally, the system 50 has a retaining element 59 which is fitted inside the cavity 7 and inside the connector 52, in order to isolate the latter from the outside and protect it from atmospheric influences.

In an embodiment of the system 50, which is not shown but can easily be deduced from the description above, the wires 513 and 514 can also be wires coaxial with one another, and in that case the connector 52 will have a central metallic terminal connected to one of the two wires 513, 514 and a metallic crown arranged around the said terminal and connected to the other of the two wires 514, 513.

Moreover, in this case the locking elements 55 are formed directly on the terminal and the crown, and have the same functions as before.

Figure 13:
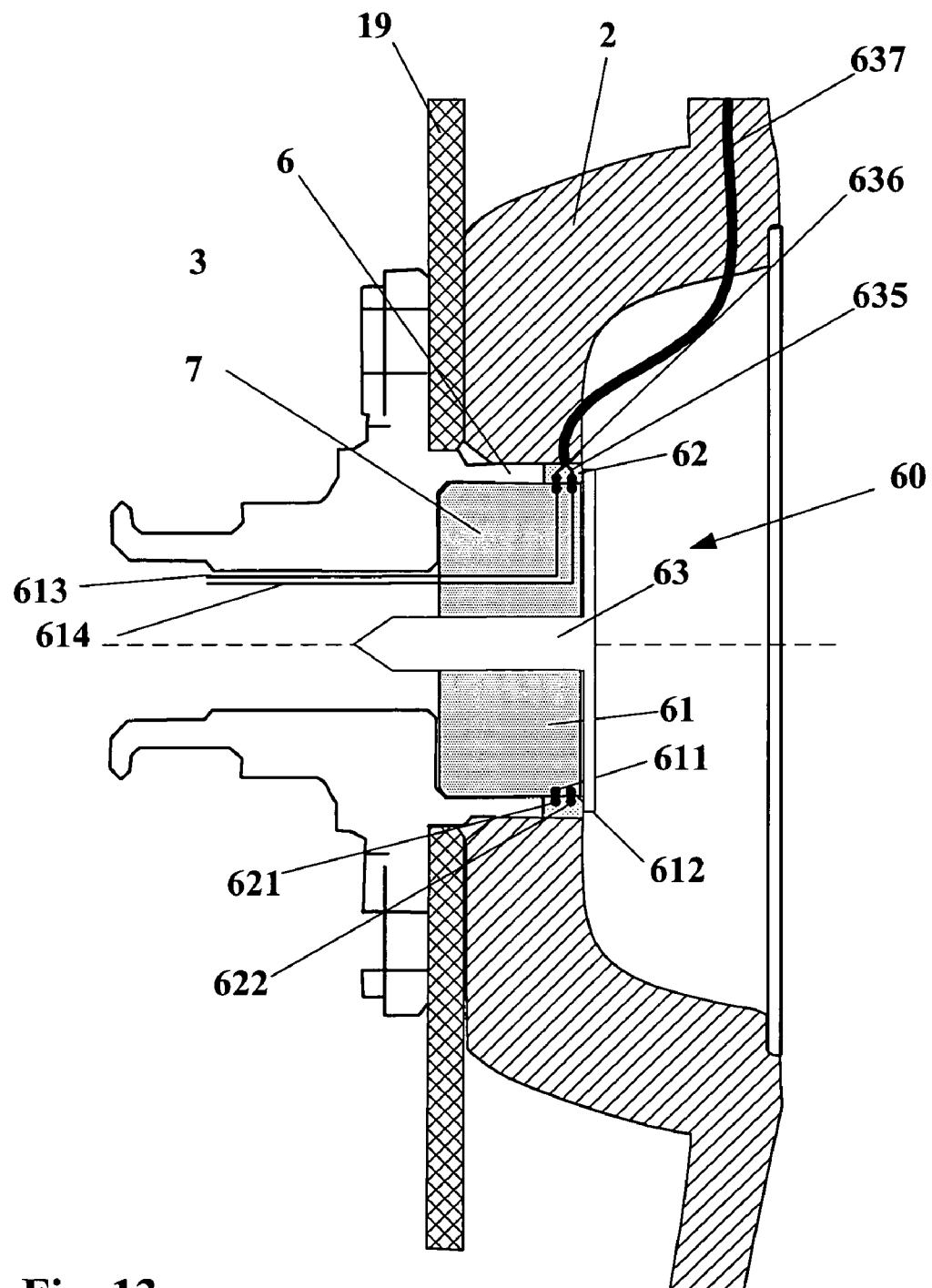
FIG. 13 shows a second preferred embodiment of the system in FIG. 8, partly in section and partly cut off for the sake of clarity.

The embodiment illustrated in FIG. 13 is a system 60 analogous to the system 30. This system 60 comprises two elements 61 and 62. The element 61 is essentially tubular or cylindrical and is designed to fit into the cavity 7 of the centering collar 6. The element 61 also has an axial depth larger than that of the centering collar 6. This element 61 has on its radially outer surface two circular conducting paths 611 and 612. The said two paths are axially offset relative to one another. The element 62 is cylindrical and is designed to fit between the radially outer wall of the element 61 and the radially inner wall of the disc 2. The element 62 also has two circular conducting paths 621 and 622 arranged after assembly opposite the corresponding paths 611 and 612 of the element 61.

The wires 613 and 614 are connected to the paths 611 and 612, and extend as before through the axial cavity 4. The wires 635 and 636 connect the contacts 621 and 622 of the element 62 to the cable 637 connected to the wheel's electric transmission means.

In this embodiment the direction of the contacts is again radial. The contacts of either one of the elements 61 and 62 can again be point contacts without adverse effect on the quality of the connection. The contacts of both elements could also be point contacts, but in that case they would have to be arranged on a precise relative azimuth to ensure electric contact of good quality.

The connection system 60 can also comprise an axial locking component 63 designed to fix the element 61 firmly within the cavity 7 of the centering collar 6. This component 63 can also secure the position of the element 62 as shown in FIG. 13.

The invention is not intended as limited to the embodiments described and illustrated, which should be regarded as examples of the electrical connection system between a wheel and a bearing-hub assembly, and which can be further modified in relation to the shapes and arrangements of the components and the details of their construction and assembly.

The invention claimed is:

1. A system for electrical connection between a wheel and a bearing-hub assembly, the wheel being mounted on an outer flange of the bearing-hub assembly, and the bearing-hub assembly comprising a rotationally fixed outer ring and an inner ring with a centering collar, a frontal open cavity defined within the said centering collar and an axial cavity that opens into the frontal cavity; the said connection system being characterized in that it comprises a first connection cable attached to the inner ring and extending within the axial cavity and the frontal cavity, a second connection cable integrated in the said wheel, and connection means associated with the said centering collar to ensure electrical contact that can be selectively disconnected between the first cable and the second cable.

2. A system according to claim 1, in which the said connection means are fixed, at least in part, in the cavity of the centering collar.

3. A system according to claim 2, in which the said connection means comprise two elements that can fit one into the other, each connected electrically to one of the first or second cables, and each comprising a set of contacts designed so that when fitted together a continuous electric connection is formed between the first and second cables.

4. A system according to claim 3, in which the said first element is a tubular component electrically connected to the first cable and designed to fit axially in the cavity of the said centering collar.

5. A system according to claim 4, in which one of the elements has a set of contacts in the form of circular conducting paths.

6. A system according to claim 5, in which the element with the set of contacts in the form of circular conducting paths is the second element.

7. A system according to claim 6, in which the said first and second sets of contacts are orientated axially.

8. A system according to claim 7 in which the said second element is a disc-shaped component electrically connected to the second cable, with means for its assembly to the said first element.

9. A system according to claim 6, in which the said first and second sets of contacts are orientated radially.

10. A system according to claim 9, in which the said second element is a tubular component electrically connected to the second cable and designed to fit radially inside the said first component.

11. A system according to claim 10, in which the said second element is a rotationally symmetrical component with a U-shaped cross-section.

12. A system according to claim 3, in which the said connection means comprise a third electrical connection element between the said second element and the second cable that can be integrated with the wheel, the said third element being removably attached to the wheel.

13. A system according to claim 9, in which the said second element is a tubular component electrically connected to the second cable and designed to fit radially externally in the said first element.

14. A system according to claim 3, arranged in correspondence with an inside wall of the centering collar and comprising a cable that extends along the cavity of the inner ring.

15. A system according to claim 3, wherein it is arranged in line with the said axis (A) and comprises a cable that extends along the cavity of the inner ring.

16. A system according to claim 15, wherein the connection cable comprises at least one wire for data transmission and at least one wire for the supply of electricity.

17. A system according to claim 16, wherein it comprises a connector mounted to rotate angularly relative to the said rotation axis A and having at least one mechanical locking element interposed between the centering collar and the wheel.

18. A system according to claim 15, wherein it comprises a retaining element associated with the centering collar to isolate the outside of the said connector and protect it from atmospheric influences.

* * * * *